United States Patent [19]

Class et al.

[11] Patent Number: 5,504,492
[45] Date of Patent: Apr. 2, 1996

[54] LOOK AHEAD SATELLITE POSITIONING SYSTEM POSITION ERROR BOUND MONITORING SYSTEM

[75] Inventors: Kim A. Class, Blaine; Randolph G. Hartman, Plymouth, both of Minn.

[73] Assignee: Honeywell Inc., Minneapolis, Minn.

[21] Appl. No.: 284,033

[22] Filed: Aug. 1, 1994

[51] Int. Cl.$^6$ .............................. H04B 7/185; G01S 5/02
[52] U.S. Cl. ............................................. 342/357; 455/12.1
[58] Field of Search .......................... 342/357; 364/449; 455/12.1

[56] References Cited

U.S. PATENT DOCUMENTS 5,225,842  7/1993  Brown et al. ............................ 342/357

OTHER PUBLICATIONS

Mats Brenner, "Implementation of a RAIM Monitor in a GPS Receiver and an Integrated GPS/IR", Sep. 19–21, 1990, in Proceedings of ION GPS-90, the Third International Technical Meeting of the Satellite Division of the Institute of Navigation.
RTCA document: "Minimum Operation Performance Standards for Airborne Supplemental Navigation Equipment Using Global Positioning Systems", Jul. 12, 1991, Appendix F.
Federal Aviation Administration "Proposed Technical Standard Order TSO–C129", Apr. 21, 1992.
Federal Aviation Administration "Technical Standard Order TSO–C129", Dec. 10, 1992.

Primary Examiner—Theodore M. Blum
Attorney, Agent, or Firm—Robert A. Pajak

[57] ABSTRACT

A method and apparatus are provided for predicting the position error bound in a satellite positioning system at a future time. The future position of each satellite at the future time is predicted from the trajectory data obtained from each satellite. The predicted position for each satellite and the estimated position of the satellite positioning system receiver is then used to generate a line of sight matrix at a future time, from which a position error bound value determined.

9 Claims, 4 Drawing Sheets

LOOK AHEAD SATELLITE POSITIONING SYSTEM POSITION ERROR BOUND MONITORING SYSTEM

BACKGROUND OF THE INVENTION

1. Field of the Invention

The present invention pertains to satellite positioning systems, and more specifically a system for predicting the value of a future position bound with respect to the estimated GPS derived position.

2. Description of the Related Art

Satellite positioning systems are now well-known in the art. Such systems, for example, NAVSTAR-GPS are rapidly being used for determination of the geocentric position of mobile units, such as water and land vehicles, aircraft and survey equipment to name a few.

In aircraft, GPS systems are being utilized for navigation, flight control, and air space control. These GPS systems may operate independently or in combination with inertial reference systems or attitude heading reference systems in order to provide information during an aircraft flight mission.

Global positioning systems similar to NAVSTAR commonly use a GPS receiver, located on a mobile unit, for receiving satellite information signals transmitted from a plurality of satellites. Each GPS satellite transmits an information signal containing data that allows a user to determine the range or distance between selected GPS satellites and the antenna associated with the mobile unit's GPS receiver. These distances are then used to compute the position of the receiver unit using known triangulation techniques. For example, in the NAVSTAR-GPS system, a mobile unit with a GPS receiver, such as an aircraft, detects a pseudo random code contained in a given GPS satellite information signal and derives therefrom the "elapsed time" or time delay between the transmission of the signal and its reception at the GPS receiver. From this time delay, the GPS receiver can derive the range between the GPS receiver antenna and the satellite, sometimes referred to as the pseudo-range or pseudo-range measurements. Herein, the GPS receiver's position, or the mobile unit's position, generally refers to the corresponding antenna position.

In addition, as part of the NAVSTAR-GPS system, each satellite information signal also contains precise ephemeris data and course almanac data which both describe the corresponding satellite orbital trajectory in earth centered space as is well known in the art. The coordinates of the satellite's orbital position may be derived from either the ephemeris data or the cause almanac data. The geocentric position of the satellite may be calculated with a higher degree of precision from the ephemeris data than is possible with the almanac data. However, because the ephemeris data precisely describes the satellite trajectory at the moment of transmission of the satellite information signal, it is only valid for a few hours thereafter, as is well known.

It should be understood that the mobile unit's three-dimensional geocentric position in World Geodetic System Coordinates nay be determined using either the ephemeris data or almanac data received from four or more satellites. Herein, it should be recognized by those skilled in the an that the World Geodetic System is an earth-centered, earth-fixed geocentric coordinate system, which may be convened to any other coordinate system as required by the user. Sometimes the aforementioned coordinate system is referred to as the WGS84 earth-centered, earth-fixed, rectangular coordinate frame. Herein, the World Geodetic System Coordinates should be presumed, and position refers to this three dimensional WGS84 coordinate system.

In order to determine the position of the GPS receiver unit, a minimum of four satellite signals are required, rather than the expected three. This is so, since the GPS receiver includes a receiver clock which is not as accurate as the atomic clock of the satellites. Therefore, receiving satellite information signals from four different satellites provides a complete solution which permits the correction of any receiver clock error as is well understood in the art. Herein, the corrected receiver clock time is referred to as the receiver time. Thus, if signals from four or more satellites are available to the GPS receiver unit, the geocentric position of the receiver may be determined within approximately one-hundred meters of its "true" geocentric position. Herein, the receiver position derived by the triangulation technique using data from multiple satellites is referred to as the "estimated position". The accuracy of the estimated position of the receiver unit is dependent upon many factors including, among others, atmospheric conditions, selective availability, and the relative position of the satellites with respect to the line of sight view of the satellites.

Associated with a GPS estimated position is a "position error bound" as particularly defined by accepted GPS system standards which have been developed by the Radio Technical Commission for Aeronautics (RTCA), in association with aeronautical organizations of the United States from both government and industry. The RTCA has defined the phrase "GPS system integrity" as the ability of a GPS system to provide timely warnings to users when the GPS system should not be used for navigation. "System integrity" is particularly identified in a document entitled "Minimum Operational Performance Standards for Airborne Supplemental Navigation Equipment Using Global Positioning System (GPS)", document number RTCA/DO-208, July 1991, prepared by: SC-159, beginning at section 1.5. As described therein, GPS is complicated in that it is a four-dimensional system involving three components of position and one time component. As also described in the aforesaid RTC A publication, the signal-in-space error transforms into a horizontal position error via a relatively complex function of the satellite geometry at any given moment. The GPS integrity system must interpret the information it has about the pseudo-range errors in terms of the induced horizontal position error, commonly referred to as the "position error bound", and then make a decision as to whether the position error bound is outside the allowable radial error, specified for a particular phase of the flight mission in progress. The allowable error is referred to as the "alarm limit", herein referred to as the integrity alarm limit. If the horizontal position error bound is found to exceed the integrity alarm limit, a timely warning must be issued by the GPS system receiver unit or sub-system Two rather distinct methods of assuring GPS integrity have evolved as civil use of GPS has progressed. One is the Receiver Autonomous Integrity Monitoring (RAIM) concept, and the other is the ground monitoring approach that goes under the name "GPS Integrity Channel" (GIC). The intent of both of these methods is the calculation of the position error bound with regard to the current GPS estimated position so that it may be compared with the alarm limit associated with a particular phase of the flight mission.

The Receiver Autonomous Integrity Monitoring System employs a self-consistency check among the measurements, more specifically, the pseudo-range measurements. Satellite redundancy is required to perform a self-consistency check on an instantaneous basis. Thus, five satellites must be in view, i.e., satellite signals received and pseudo range measurements calculated by the GPS receiver. If fewer than five satellites are in view the value of the predicted position error bound will be infinite. Also, there are constraints on the satellite constellation geometry that must be met if the check is to be effective in the presence of noise. Generally speaking, a satellite constellation with many satellites in view, permits a robust integrity monitoring system. Conversely, a satellite constellation having only a few satellites in view may limit the availability of an integrity monitoring system. There may be short periods when a good consistency check is not possible (less than 5 satellites in view). The main feature of RAIM is that it is completely self-contained and relatively easy to implement in software.

Examples of RAIM may be found in the aforementioned RTCA publication, Appendix F, and another is described in an article entitled "Implementation of a RAIM Monitor in a GPS Receiver and an Integrated GPS/IR" by Mats Brenner located at page 397 in the Proceedings of ION GPS-90, Third International Technical Meeting of the Satellite Division of the Institute of Navigation, Sep. 19–21, 1990.

GPS systems which incorporate RAIM output a position error bound which represent the probabilistic radial errors of the navigation solution, namely the GPS estimate position of the receiver unit. Currently, RAIM may generate several numbers including, a horizontal position error bound, a vertical position error bound, and a spherical position error bound for the current time, i.e., the instant of time the GPS measurements occurred. A calculation for the horizontal position error bound, A r_$\max_{der}$, is further described in equation 21 of the aforementioned Mats Brenner paper. Herein the term, position error bound, will be used to denote either separately or the combination of the horizontal, vertical and spherical position error bounds.

Once calculated, the position error bound is used to determine if the pilot can rely on the derived GPS estimated position for the current phase of flight. It should be recognized that some interpolation may be required dependent upon the receiver's ability to simultaneously receive a plurality of satellite information signals as is well understood in the art.

The allowable integrity alarm limit value, may change depending on the phase of the aircraft flight mission. For instance, if a pilot is flying in the terminal phase, the integrity alarm limit may be less stringent than if the pilot is in the approach phase of flight. If the pilot is to transition from the terminal phase of right to the approach phase of flight, the pilot needs to know whether the current position error bound is sufficient to allow the pilot to rely upon the GPS solution to make the transition.

GPS systems may provide the pilot a predicted position error bound based on the estimated time of arrival (ETA) at a landing strip. In this scenario however, the predicted position error bound may be unreliable, or overly optimistic for several reasons. First, the aircraft may arrive at a time other then original ETA. Thus, satellites predicted to be available at the original ETA may not be available at the revised ETA. Secondly, a satellite information signal that was predicted to be available at the original ETA, might not be able to be obtained by the GPS receiver when predicted. This could be due to atmospheric effects, satellite failure, signal blockage, or receiver shielding. If the position error bound is not within the specified integrity alarm limit, a pilot may have to execute a missed approach.

SUMMARY OF THE INVENTION

The present invention provides a satellite positioning system integrity monitoring system for future phases of flight so as to provide the pilot a timely warning as to whether or not estimated position information may be used for navigation and/or flight control. In the present invention, the future position of each satellite at a future time is calculated from the trajectory data obtained from each satellite utilized in the current estimated position determination. The predicted position for each satellite and the estimated position of the satellite positioning system receiver is then used to generate a line of sight matrix at the selected future time from which an integrity processor derives a predicted position error bound at the future time.

DESCRIPTION OF THE PREFERRED EMBODIMENT

Figure 1:
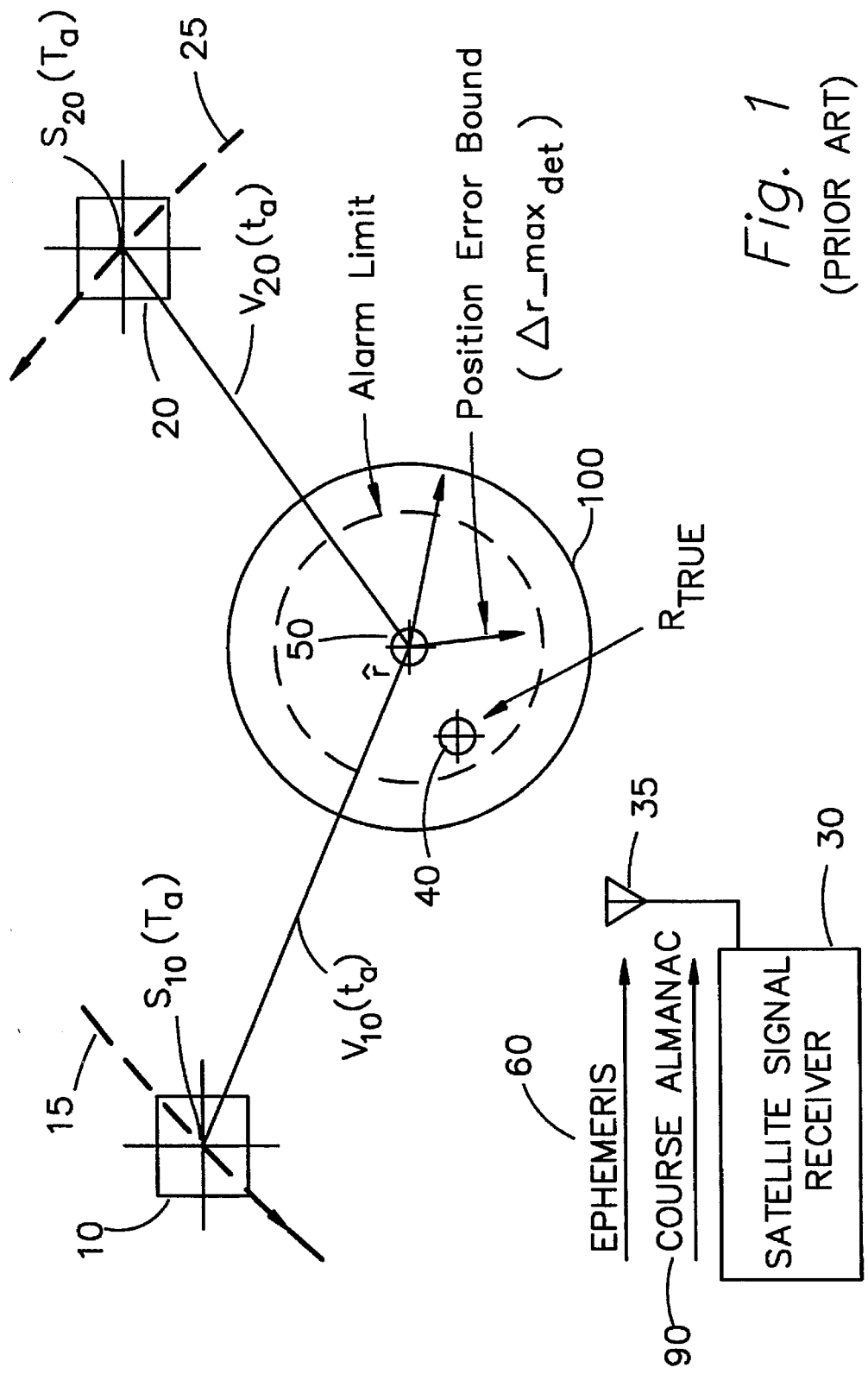
FIG. 1 is a diagram illustrating a satellite positioning system of the prior art.

FIG. 1 is an illustration depicting the mechanics of a GPS system well-known in the art. In this illustration only two satellites are shown in order to simplify understanding of a GPS system, whereas four are necessary for a GPS estimated position solution, and at least five are required for application of a RAIM type integrity monitoring system.

There shown in FIG. 1 is a first satellite 10 at a position at time $t_a$ having geocentric coordinates (X,Y,Z), denoted as $S_{10}(t_a)$. It should be noted that satellite 10 is following orbit 15, moving from upper right to lower left. Also shown is a second satellite 20 at position $S_{20}$ at time $t_a$ and following orbit 25 (moving from lower right to upper left).

A mobile unit (not shown) such as an aircraft, includes a satellite signal receiver 30 having an antenna 35 for receiving an information signal from each satellite tracked or in view, e.g., satellite 10 and 20. Each satellite information signal contains ephemeris data 60 and course almanac data 90, having characteristics as generally described above, and in accordance with the particular satellite positioning system standards.

As depicted in FIG. 1, the receiver 30, and more particularly antenna 35, are at some true position identified by numeral 40, and designated $R_{True}$. In contrast, an estimated geocentric position of the receiver 30, $\hat{r}$, denoted by numeral 50 is derived from the pseudo range data of at least four satellites as will be described with reference to FIG. 2.

Figure 2:
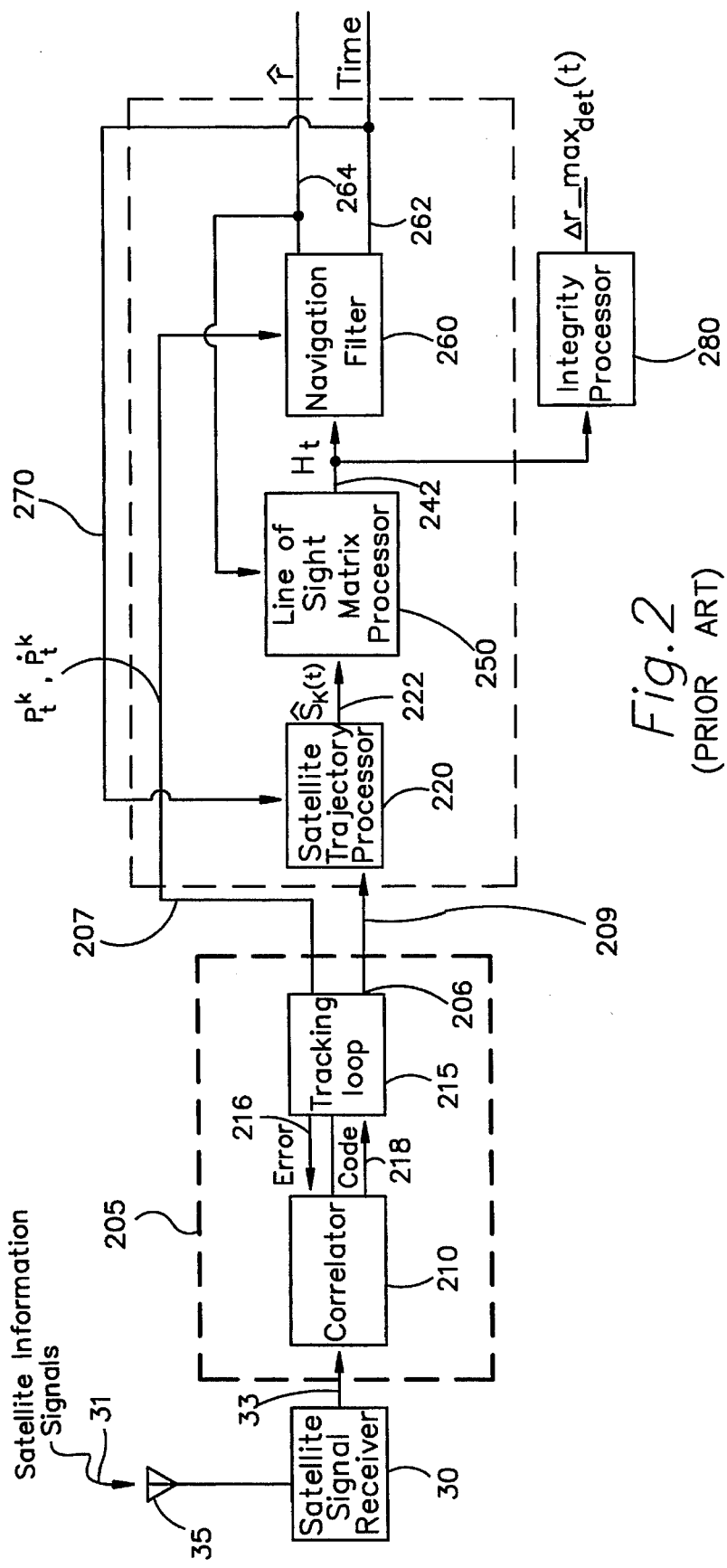
FIG. 2 is a schematic block diagram of the satellite positioning system of FIG. 1.

Referring now to FIG. 2, there shown is a block diagram generally depicting a GPS receiver system with a RAIM integrity monitoring system, which is well known in the art, for calculating the position error bound. The purpose of the exposition which follows regarding the general GPS receiver structure is intended only to assist the reader in an understanding of the present invention, and is not intended to be complete. Details of GPS receiver designs are well known in the art and such GPS receivers are manufactured by, among others, Honeywell Inc. and Trimble Inc.

As illustrated in FIG. 2, satellite signal receiver 30, like that of FIG. 1, receives the satellite information signals as may be detected by antenna 35. Signal processor 205 is intended to derive unique satellite information indicated by data signal line 31 from corresponding satellite information signal 31 from each of the tracked satellites. This satellite information includes the pseudo range between the receiver and the corresponding $k^{th}$ satellite at time t denoted as $P_t^k$, a pseudo range rate denoted as $\dot{P}_t^k$ and the trajectory data 206 for each satellite k, including at certain times ephemeris data and almanac data. In general, the ephemeris data contains the most current trajectory data, as coefficients for a fourth order equation representing the current position trajectory as related to its atomic clock time..

Signal processor 250 processes each satellite information signal 31 and provides as outputs the trajectory data on data signal line 206 and pseudo range and pseudo range rate data on data signal line 207.

By way of example, similar to the devices in the prior art, signal processor 209 includes a correlator 210 and tracking loop 215. Correlator 210 is shown to be responsive to the satellite signal information 33 and error information 216 from tracking loop 215. Correlator 210 derives the pseudo-random code 218 unique to each of the satellite information signals from each of the tracked satellites, in such a manner as to minimize the error signal received from tracking loop 215.

The GPS receiver system further includes a navigation solution signal processor 270 which data 207 receives as inputs the trajectory data 206, the pseudo range $P_t^k$, and the pseudo range rate $\dot{P}_t^k$ from processor 205 for each of the tracked satellites. Similar to GPS receiver systems in the prior art, signal processor 270 includes a satellite trajectory processor 220, a line of sight matrix processor 250 and a navigation filter 260. As will be described in greater detail, satellite trajectory processor 220 calculates a position for each satellite, indicated by output 222, from the trajectory data 206, and the receiver time on data signal line 262 produced by navigation filter 260. Line of sight matrix processor 250 outputs a line of sight matrix H(t) determined by the known positions of each tracked satellite, as determined by processor 220 and the estimated position r̂ of the GPS receiver, derived by navigation filter 260. Navigation filter 260 outputs the receiver time, indicated by data signal line 262, and the estimated position r̂, indicated by data signal line 264, as a function of line of sight matrix H(t), and the pseudo range $P_t^k$ and the pseudo range rate $\dot{P}_t^k$ for each of the tracked satellite information signals derived by signal processor 205.

As described, satellite trajectory processor 220 receives the trajectory data 206 and the receiver time, t, from navigation filter 260. Satellite trajectory processor 220 utilizing, by way of example, Keppler's orbital equations, determines the coordinates of the satellite position for each $k^{th}$ satellite information signal received by satellite receiver 30 at receiver time, t, identified as:

$$\hat{S}_k(t)$$

As aforesaid matrix processor 250 calculates the line of sight-matrix H(t) from the estimated position r̂, received from navigation filter 260, and the geocentric positions of each of the satellites at time t from satellite trajectory processor 220. By way of example, illustrated in FIG. 1, line of sight-matrix H(t) includes coordinate system components of vectors $V_{10}(t_a)$ and $V_{20}(t_a)$ which are the line of sight vectors at receiver time $t_a$, from the receiver's estimated position, r̂, to satellites 10 and 20, respectively.

Navigation filter 260, as aforesaid, receives the line of sight-matrix H(t) and the pseudo range $P_t^k$, and the pseudo range rate $\dot{P}_t^k$ from signal processor 205 It should be noted that the pseudo-range measurements $P_t^k$ and pseudo range rate $\dot{P}_t^k$, for all of the tracked satellites in view, are derived from each of the independent satellite information signals. These two values are not dependent upon any of the pseudo-range values from other satellites. Navigation filter 260 provides as outputs, the GPS estimated geocentric position r̂ of the receiver, and the current time, t. When more than four satellites are utilized, the system can perform redundancy checks.

It should be noted here that the current time value produced by navigation filter 260 is a time value in which all of the pseudo range measurements have been mathematically made to coincide, as is well known, to produce a valid GPS estimated position by the triangulation technique.

Also illustrated in FIG. 2 is integrity processor 280 for calculating the position error bound corresponding to each estimated position produced by navigation filter 260. Integrity processor 280 receives as an input the H(t) matrix from matrix processor 250. Integrity processor 280, in turn, calculates from the H(t) matrix the current position error bound, identified as:

$$\Delta r\_\ \max_{det}(t)$$

It should also be noted that variances, or errors, in the line of sight matrix, sometimes referred to as delta pseudo errors, must also be taken into account when generating the position error bound. These variances may also be calculated by navigation filter 260, or a value can be assumed when calculating the position error bound by integrity processor 280. The details of how the position error bound is calculated from the H(t) matrix, and its variances, is described in detail in the above-referred to publication by Mats Brenner and is not further described herein.

The RTCA has imposed, for the approach phase of a flight mission, that the position error bound on the receiver's estimated position, r̂ be better than 0.3 nautical miles at a reliability 99.999%, and that these values are sufficient for reliance by a pilot for navigation. In this circumstance the integrity alarm limit is 0.3 nautical miles. If the position error bound output of the integrity processor 280 is less than 0.3 nautical miles at 99.999% reliability, it is within the alarm limit value, as indicated by the diagram illustrated in FIG. 1. In this case, it is extremely likely that the "true" geocentric position $R_{TRUE}$ is within 0.3 nautical miles from the estimated position r̂. Thus the pilot may rely on the GPS estimated position for aircraft navigation.

FIG. 1 graphically illustrates the resultant position error bounds produced by integrity processor 280. There shown is a circle 100 having a center 50. The center of the circle represents the estimated position r̂. The radius of the circle represents an integrity alarm limit value, e.g. 0.3 nautical miles at 99.999% reliability. The inner circle represents a calculated position error bound at 99.999% reliability.

If the integrity processor provides a GPS position error bound within the alarm limit, the "true" geocentric position of the mobile unit, indicated by numeral 40, is expected to be within the 0.3 nautical mile radius of the GPS estimated position r̂, numeral 50.

It should be noted that the alarm limit is dependent on the different flight phases of the flight mission. It should also be noted that the position error bound produced by integrity processor 280 is a function of an algorithm having as variables the selected tolerable position error, e.g. 0.3 nautical miles, and the desired reliability, e.g. 99.999%. These variables may be changed by the FMS depending on the flight phase.

Figure 3:
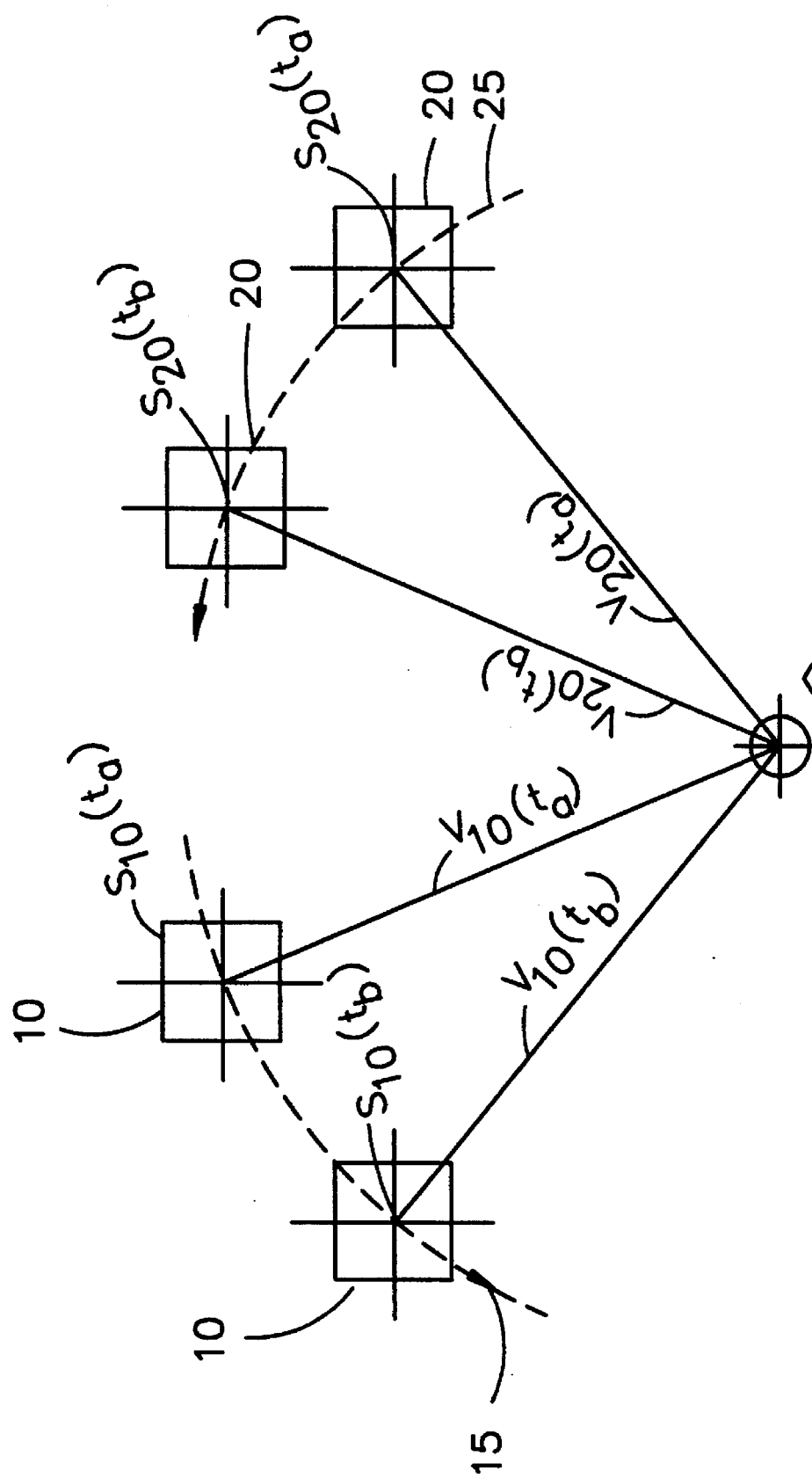
FIG. 3 is a diagram illustrating a satellite positioning system in accordance with practice of the present invention.

Illustrated in FIG. 3 is a satellite scenario illustrating the employment of the present invention. There shown are satellites 10 and 20 moving from a first position at time $t_a$ to a second position at time $t_b$. More specifically, assume that the satellites 10 and 20 are at positions $S_{10}(t_a)$ and $S_{20}(t_a)$, respectively, at time $t_a$. After an elapsed time, at time $t_b$, satellite 10 moves from position $S_{10}(t_a)$ to $S_{10}(t_b)$, and satellite 20 moves from position $S_{20}(t_a)$ to $S_{20}(t_b)$.

In the following, it is of paramount importance to understand that if the elapsed time after time $t_a$ is known, namely when time equals $t_b$, and the elapsed time being relatively small, then the position of satellites 10 and 20 at positions $S_{10}(t_b)$ and $S_{20}(t_b)$ may be accurately predicted from the corresponding satellite trajectory data. This data not only establishes the positions of satellites 10 and 20 at positions $S_{10}(t_a)$ and $S_{20}(t_a)$, but also accurately describes the current trajectory of the satellite for time values shortly thereafter. As indicated earlier, preferably ephemeris data is utilized, but alternative almanac data, or combinations of both may be employed.

As a further assumption, it is assumed that the distance traversed by satellites 10 and 20 from their positions at time $t_a$ to their new positions at time $t_b$ is relatively large when compared to the change in position of the GPS antenna on the mobile unit. It is also assumed that any change in the line of sight vector for a short period of time after time $t_a$ will be influence more by the change in the position of the satellites 10 and 20 than by the change in the estimated position, $\hat{r}$. This is particularly illustrated in FIG. 3 by vectors $V_{10}(t_a)$ and $V_{10}(t_b)$, the corresponding vectors between the estimated position $\hat{r}$ and satellite 10 at positions $S_{10}(t_a)$ and $S_{10}(t_b)$, and by vectors $V_{20}(t_a)$ and $V_{20}(t_b)$, the corresponding vectors between the estimated position $\hat{r}$ and satellite 20 at positions $S_{20}(t_a)$ and $S_{20}(t_b)$, respectively.

Figure 4:
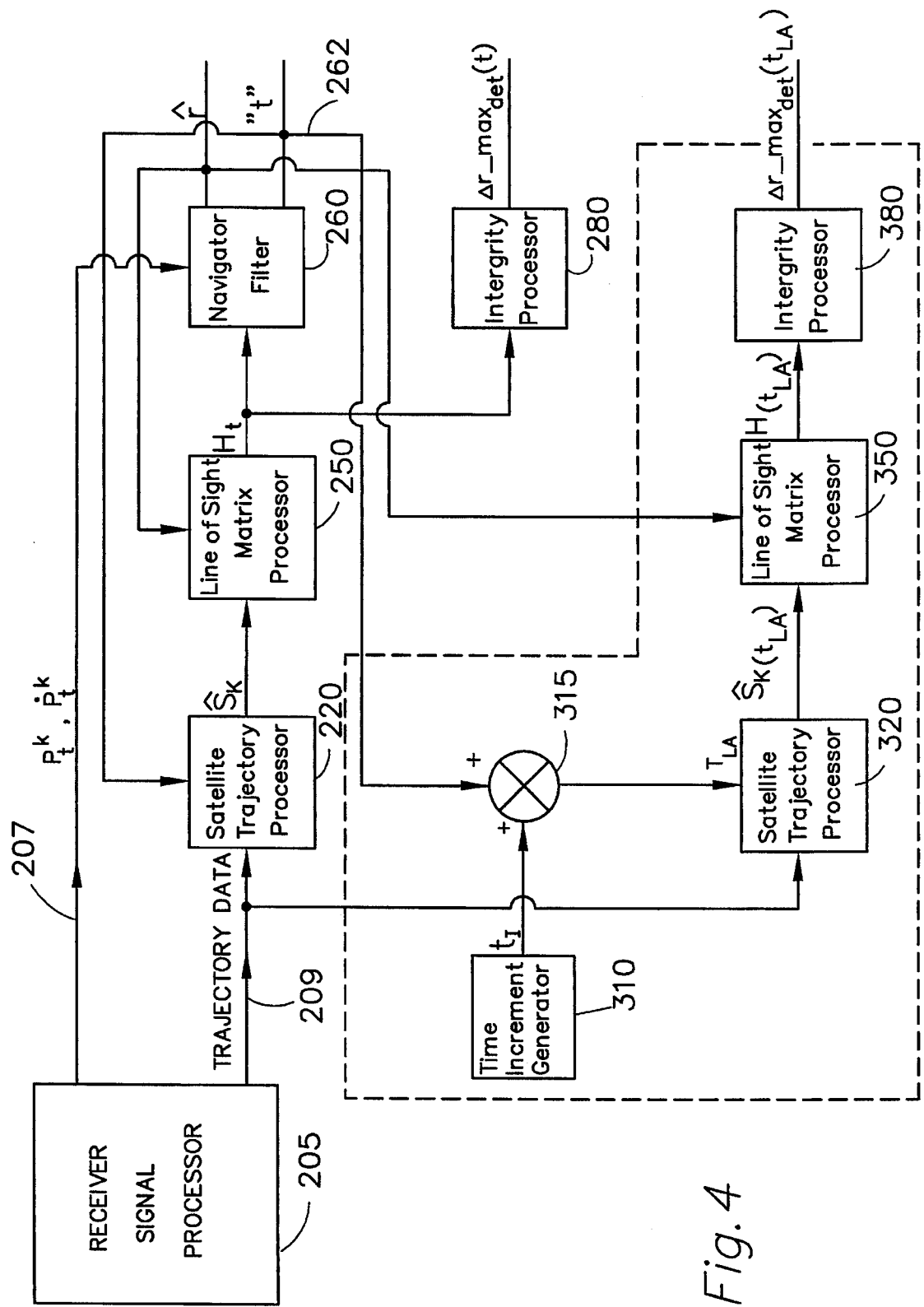
FIG. 4 is a schematic block diagram of the satellite positioning system of the present invention.

Illustrated in FIG. 4 is a schematic block diagram of a "look-ahead" GPS integrity monitoring system 300 constructed in accordance with the present invention. Components in FIG. 4 having the same function as illustrated in FIG. 2 have retained the same numeral designation. Monitoring system 300 is comprised of a time increment value generator 310, a summing means 315, a satellite trajectory processor 320, a line of sight matrix processor 350 and an integrity processor 380.

Time increment generator 310 produces a time increment value, $t_1$, representing the quantity of time monitoring system 300 is to look beyond the time value 262 produced by navigation filter 260. In the preferred embodiment, the time increment value $t_1$ is a constant. It should be noted however, that the time increment value, $t_1$ may be selectively changed by either human or computer control.

Summing means 315 serves to sum the time value "t", on data signal line 262, from Navigation filter 260 and the time increment value $t_1$ to establish a "look ahead" time value $t_{LA}$. It should be noted that the time value t and $t_{LA}$ represent atomic clock time from which the positions of the satellites may be determined from the trajectory data e.g. almanac or ephemeris data.

Satellite trajectory processor 320 operates in substantially the same manner as the previously described satellite trajectory processor 220. Satellite trajectory processor 320 receives the trajectory data produced by signal processor 205 and the look ahead time value, $t_{LA}$. Based on the trajectory data received at time t, satellite trajectory processor 320 predicts the position of each satellite, k, for time $t_{LA}$. The predicted positions of the k satellites at time $t_{LA}$, are identified as:

$$\hat{S}_k(t_{LA})$$

Line of sight matrix processor 350, similar to line of sight processor 250, calculates a line of sight-matrix $H(t_{LA})$ in response to the predicted satellite position information from satellite trajectory processor 320 and the estimated position $\hat{r}$, from navigation filter 260. In the preferred embodiment, line of sight matrix processor 350 utilizes the estimated position $\hat{r}$ at time t, as opposed to a predicted GPS estimated position at the look ahead time value $t_{LA}$. This implies that over the predicted time increment value $t_1$, the line of sight matrix is predominately affected by the change in satellite position, rather than changes in the position of the mobile unit. It should be noted however, that circuitry or software may be constructed which could provide matrix processor 350 with a predicted GPS estimated position of the mobile unit at time $t_{LA}$. This could be accomplished through the use of internal navigation equipment and/or the FMS (not shown).

After the line of sight matrix $H(t_{LA})$ is determined at the predicted look-ahead time, namely $t_{LA}$, integrity processor 380 may calculate a predicted position error bound at time $t_{LA}$ identified as:

$$\Delta r\_max_{def}(t_{LA})$$

This predicted position error bound at time $t_{LA}$ is a prediction of what the position error bound may be at time $t_{LA}$ based only on tracked satellite information signals which were utilized to obtain the original estimated position at time "t".

In the preferred embodiment of the invention, line of sight processor matrix processor 350 and integrity processor 380 include processing functions which eliminate satellite position information for calculation of the predicted RAIM derived position error bound when the satellites do not meet the "in view" requirements of the RTCA. Namely, those satellites which would be less than 7.5° from the horizon are discarded and not used as pan of the calculations for either the predicted line of sight matrix and/or the predicted position error bound value at time $t_{LA}$.

In the preferred embodiment of the invention, it is intended that integrity monitoring system 300 make integrity monitor measurements in which the satellite positions are predicted five minutes ahead of the time from which the last estimated position was calculated by Navigation filter 260. In this case, $t_1$ is 5 minutes. In accordance with the present invention, the pilot of an aircraft may continue to be given position error bound values, for future phases of a flight by a selected time increment value, $t_1$. This time increment value may be either fixed, or pilot selected, as desired. The ability to have the look ahead GPS position error bound values is of particular importance during the latter phases of a flight mission, more specifically, during the descent and the landing approach flight phases. In practice of the present invention, the pilot may be able to determine whether or not the GPS aircraft position information may be relied upon for the descent and approach, and take necessary action in case the GPS integrity is beyond that required for pilot reliance.

For example, it may be necessary for the pilot to delay the final approach or descent phases of the flight mission such that the satellite constellation is allowed to be in a position whereby the pilot may rely upon the GPS position information and utilize such information for both navigation, flight control, and also landing of the aircraft. Alternatively, the pilot may take other actions, namely not relying upon the use of GPS at all during the final phases of the flight. Thus, in practice of the present invention, the pilot is allowed to make such decisions in advance, heretofore not available, with reliance on accuracy of the GPS solution of future phases of the flight mission.

In the preferred embodiment of the present invention (i) the predicted position error bound is based on the trajectory data from the more precise ephemeris data of only those satellites whose pseudo-range information is currently being utilized in the position calculation; and (ii) the look ahead time increment value is chosen to be only a few minutes. This obviates problems associated with pilot reliance on a predicted GPS position error bound at the flight mission ETA (estimated time of arrival). Thus, even if the landing is at a time other then the original ETA, the pilot will still have a look-ahead indication of GPS availability. It should be noted that embodiments of the present invention can be constructed in which the predicted position error bound is based on the trajectory data from the less precise almanac data of only those satellites whose pseudo-range information is currently being utilized in the GPS estimated position calculation The present invention has been described in terms of schematic block diagrams employing one GPS system integrity monitoring scheme for providing a position error bound in accordance with a specific GPS integrity monitoring scheme. As indicated, there are other satellite positioning system integrity monitoring schemes which may be alternatively employed, and are intended to be within the true spirit and scope of the present invention.

It should be recognized that the schematic block diagrams particularly illustrated in FIGS. 2 and 4 may be configured by employment of many electronic subsystems, computers, and software/firmware implementations. More specifically, as illustrated in FIG. 4, there shown are two independent integrity processors 280 and 380, two independent line of sight matrix processors 250 and 350 and two satellite trajectory processors 220 and 320. As is well understood in the art, a single electronic/software subsystem may be employed for performing the appropriate calculations and generation of the position error bound values, which are intended to be within the true spirit and scope of the present invention.

The navigation filter as illustrated in the drawings may employ a particular method for achieving the intended function of producing the estimated position "f" at time "t". One such method is the well known use of a Kalman filter.

Although a brief schematic diagram has been illustrated to show the general nature of a satellite signal receiver correlator and tracking loop, other arrangements are of course possible and are also within the true spirit and scope of the present invention.

Lastly, although the present invention is intended to be operative with the NAVSTAR GPS system, other positioning systems are also within the true spirit and scope of the present invention. More specifically, any such satellite system by which an aircraft may obtain geocentric position information from satellite information signals, is intended to be within the true spirit and scope of the present invention.

The embodiments of an invention in which an exclusive property or right is claimed are defined as follows:

1. A satellite positioning system comprising:
   a satellite positioning system receiver for receiving a satellite information signal transmitted from each of selected ones of a plurality of satellites, and for deriving corresponding satellite data from each received satellite information signal, where each satellite information signal contains satellite data sufficient to determine the corresponding range between the satellite and said satellite positioning system receiver, and which said satellite data from selected ones of a plurality of satellites is sufficient to determine an estimated geocentric position of said satellite positioning system receiver;
   an information signal processor for deriving from said satellite data at least i) information for determining the trajectory of each of said selected ones of said plurality of satellites, and ii) pseudo range values, where each of said pseudo range values is an estimate of the true range value between said receiver and a mutually exclusive one of said selected ones of said plurality of satellites determined by a measurement of the corresponding satellite signal travel time from the satellite to the receiver;
   means for deriving an estimated geocentric position of said receiver, at a particular time, as a function of selected ones of said pseudo range values and corresponding ones of the geocentric positions of said plurality of said satellites derived from said trajectory information;
   means for deriving a line of sight vector measurement matrix H in which said line of sight vector measurement matrix is descriptive of the vectors between said estimated geocentric position of the receiver and said geocentric position of said selected satellites at a selected future time;
   an integrity processor responsive to said line of sight vector measurement matrix H at said selected future time for determining a position error bound value at said future time.

2. The global positioning system of claim 1 comprising:
   means for determining an error value associated with each of said pseudo range values, where each of said error values relates the difference between said pseudo range value and a corresponding estimated range value, where said estimated range value is substantially the vector magnitude of the vector between said estimated position of said receiver and the corresponding one of said geocentric position of said satellites;
   where in said integrity processor is responsive to said line of sight vector measurement matrix H at said selected future time and said error values for predicting a position error bound having a selected reliability.

3. A method for determining a future time position error bound for a satellite positioning system receiver comprising the steps of:
   (a) obtaining, from a satellite positioning system receiver, satellite trajectory data from one or more tracked satellites, a receiver time, and an estimated receiver position of said satellite positioning system receiver;
   (b) generating a look-ahead time value by adding a time increment to said receiver time;
   (c) calculating a predicted position for each satellite based on the trajectory data for each satellite and the look-ahead time value;
   (d) using the predicted position for each satellite and the estimated receiver position to generate a line of sight matrix;
   (e) producing a predicted position error bound from said line of sight matrix.

4. The method in claim 3 wherein said estimated position is the position of the satellite position system receiver at the receiver time.

5. The method in claim 3 wherein said estimated position is a predicted location of the satellite position system receiver at the look-ahead time.

6. The method in claim 3 wherein said time increment is 5 minutes.

7. The method in claim 3 wherein said time increment may be altered.

8. The method in claim 3 wherein said trajectory data is almanac data.

9. The method in claim 3 wherein said trajectory data is ephemeris data.

* * * * *